United States Patent [19]

Takeuchi

[11] Patent Number: 5,048,304
[45] Date of Patent: Sep. 17, 1991

[54] PORTABLE AIR CONDITIONING APPARATUS HAVING LARGE WATER SUPPLYING CAPACITY TO EVAPORATION TYPE CONDENSER THEREIN

[75] Inventor: Tomoyoshi Takeuchi, Mishima, Japan

[73] Assignee: Kabushiki Kaisha Toshiba, Kawasaki, Japan

[21] Appl. No.: 546,700

[22] Filed: Jul. 2, 1990

Related U.S. Application Data

[63] Continuation of Ser. No. 295,373, Jan. 10, 1989, abandoned.

[30] Foreign Application Priority Data

Feb. 29, 1988 [JP] Japan .................................. 63-46814

[51] Int. Cl.⁵ .............................................. F28D 5/00
[52] U.S. Cl. ....................................... 62/305; 62/183; 62/506
[58] Field of Search .................. 62/305, 506, 183, 279, 62/280

[56] References Cited

U.S. PATENT DOCUMENTS

| 3,635,046 | 1/1972 | Sato et al. | 62/305 |
| 3,926,000 | 12/1975 | Scofield | 62/506 X |
| 4,028,906 | 6/1977 | Gingold et al. | 62/183 |
| 4,240,265 | 12/1980 | Faxon | 62/305 X |
| 4,266,406 | 5/1981 | Ellis | 62/183 |
| 4,365,483 | 12/1982 | Binger | 62/183 |
| 4,494,384 | 1/1985 | Lott | 62/506 X |
| 4,542,627 | 9/1985 | Welker | 62/305 |
| 4,768,349 | 9/1988 | Lin et al. | 62/305 X |

*Primary Examiner*—Lloyd L. King
*Attorney, Agent, or Firm*—Cushman, Darby & Cushman

[57] ABSTRACT

An external water supply tank having a relatively large water storage capacity fixed to the outside of a portable air conditioning apparatus to supply water to a spray device disposed in the air conditioning apparatus for cooling a condenser subject to generation of heat.

8 Claims, 4 Drawing Sheets

PORTABLE AIR CONDITIONING APPARATUS HAVING LARGE WATER SUPPLYING CAPACITY TO EVAPORATION TYPE CONDENSER THEREIN

This application is a continuation of application Ser. No. 07/295,373 filed 1/10/89, now abandoned.

BACKGROUND OF THE INVENTION

1. Field of the Invention

This invention relates, in general, to air conditioning apparatus. In particular, the invention relates to a portable air conditioning apparatus which includes an evaporation type condenser and an evaporator disposed in an common casing, which may be moved to a desired place.

2. Description of the Related Art

As shown in FIG. 1, a well known portable air conditioning apparatus 11 typically includes an evaporation type condenser 13 and a spray device 15, which sprays water on evaporation type condenser 13. A casing 17 of air conditioning apparatus 11 is partitioned into an upper chamber 19 and a lower chamber 21 with a partition plate 23. An air discharging opening 25 is formed in the front surface of casing 17. An air intake opening 27 is formed in the rear surface of casing 17. A fan casing 28 is arranged in upper chamber 19, and opens to air discharging opening 25. An internal fan 29 is rotatably disposed in fan casing 27, is supported by one of the rotatable shafts 30a of a two-shaft motor 30 arranged in lower chamber 21. An evaporator 31 and an auxiliary heat-exchanger 33 arranged parallel to evaporator 31 are disposed in upper chamber 19 so as to be opposite to air intake opening 27.

An exhausting fan 35 and the above-described spray device 15 are coaxially supported by the other rotatable shaft 30b of two-shaft motor 30 in lower chamber 21. Exhausting fan 35 is a centrifugal fan device, and is disposed between two-shaft motor 30 and spray device 15. An exhausting fan casing 37 is disposed around exhausting fan 35. A flexible air guide hose 39 is inserted into an outlet 37a of exhausting fan casing 37 to guide air from exhausting fan 35 to the external atmosphere. A second air intake opening 41 is formed in the rear surface of casing 17 close to outlet 37a of exhausting fan casing 37 to take external air into lower chamber 21 of casing 17. Spray device 15 includes a cylinder 15a, the diameter of which gradually increases from the lower end toward the upper end. A plurality of fins (not shown) extend from the inner peripheral wall of cylinder 15a toward rotatable shaft 30b, and each extended end of the fins is fixed to a hub (not shown) which is firmly fixed to rotatable shaft 30b of motor 30. The lower end of cylinder 15a of spray device 15 is dipped into water in a water tank 43 disposed on the bottom surface of casing 17. Water tank 43 is partitioned into two vessel portions. The lower end of cylinder 15a extends into water in one of the two vessel portions. A water supply pipe of a water storage tank (not shown) extends into the water in the other vessel portion of water tank 43. One end of a drain hose (not shown) is connected to the other vessel portion of water tank 43, and the other end of the drain hose is connected to a drain tank (not shown). Drain water condensed on evaporator 31 and auxiliary heat-exchanger 33 is collected in the drain tank, and is stored in water tank 43 through the drain hose. Water tank 43 is provided with a float switch 47 to detect the level of water stored in water tank 43.

As shown in FIG. 1, evaporation type condenser 13 is coiled around the periphery of cylinder 15a of spray device 15 so as to maintain a predetermined distance between coiled condenser 13 and cylinder 15a. A cylindrical cover 49 is disposed outside condenser 13 to prevent water from being scattered to lower chamber 21. A refrigerating circuit of the above-described air conditioning apparatus includes evaporation type condenser 13, evaporator 31, auxiliary heat-exchanger 33, and other components (not shown), such as, e.g., compressor, capillary tube, etc.

When the cooling operation is executed by the above-described conventional air conditioning apparatus, the compressor (not shown) and two-shaft motor 30 are operated. Thus, internal fan 29, exhausting fan 35, and spray device 15 are driven by motor 80. Internal air is taken into upper chamber 19 of casing 17 through air intake opening 27, and is cooled by evaporator 31 and auxiliary heat-exchanger 33. The cooled internal air is supplied to a defined space to be cooled. When exhausting fan 35 is driven, the internal air also is taken into lower chamber 21 of casing 17 through second air intake opening 41 to cool condenser 13. After cooling condenser 13, air is exhausted to the outside of the defined space through exhausting fan 15 and air guide hose 39. At this time, spray device 15 also cools condenser 13. Water in water tank 43 is drawn up by spray device 15, and is sprayed from the upper end portion of spray device 15 in the centrifugal direction. Thus, the sprayed water falls on condenser 13 to cool condenser 13. After that, water is collected in water tank 43.

In the above-described air conditioning apparatus, since water sprayed onto condenser 13 which has a relatively high temperature tends to evaporate, the level of water in water tank 43 rapidly decreases. To control the decrease of water in water tank 43, the air conditioning apparatus is provided with a water supply tank (not shown) therein. When water is evaporated because of condenser is having a relatively high temperature, and the water level in water tank 43 detected by float switch 47 decreases, water in the water supply tank is automatically supplied to water tank 43. However, in the conventional air conditioning apparatus, the installation space for the water supply tank is restricted by the external size of the air conditioning apparatus. It is rather difficult to install a water tank having a desirable large water storage capacity in the air conditioning apparatus. Therefore, the period for which the water level in water tank 43 can be maintained to cool evaporator 13 is relatively short, e.g., four hours, in an average air conditioning apparatus. It is rather troublesome to frequently replenish the water supply tank with water.

SUMMARY OF THE INVENTION

Accordingly, it is an object of the present invention to decrease the use for water replenishment to a water supply tank of a portable air conditioning apparatus.

To accomplish the above-described object, a portable air conditioning apparatus includes a movable outer casing, an air conditioning unit, having a condenser cooled by water, disposed in the outer casing for conditioning air flowing into a defined space, and an external water supply tank connected to the outer side wall of the outer casing for storing water supplied to the condenser.

The air conditioning unit may include a spray device for spraying water onto the condenser. The air conditioning apparatus may also include a pivot device between the outer casing and the external water tank to rotate the external water supply tank from an butting relation with one of the adjoining outer side walls of the outer casing to an abutting relation with the other side wall.

BRIEF DESCRIPTION OF THE ACCOMPANYING DRAWINGS

Other features and advantages of the present invention will be apparent from the following description taken in connection with the accompanying drawings wherein.

DETAILED DESCRIPTION OF THE PREFERRED EMBODIMENTS

Figure 1:
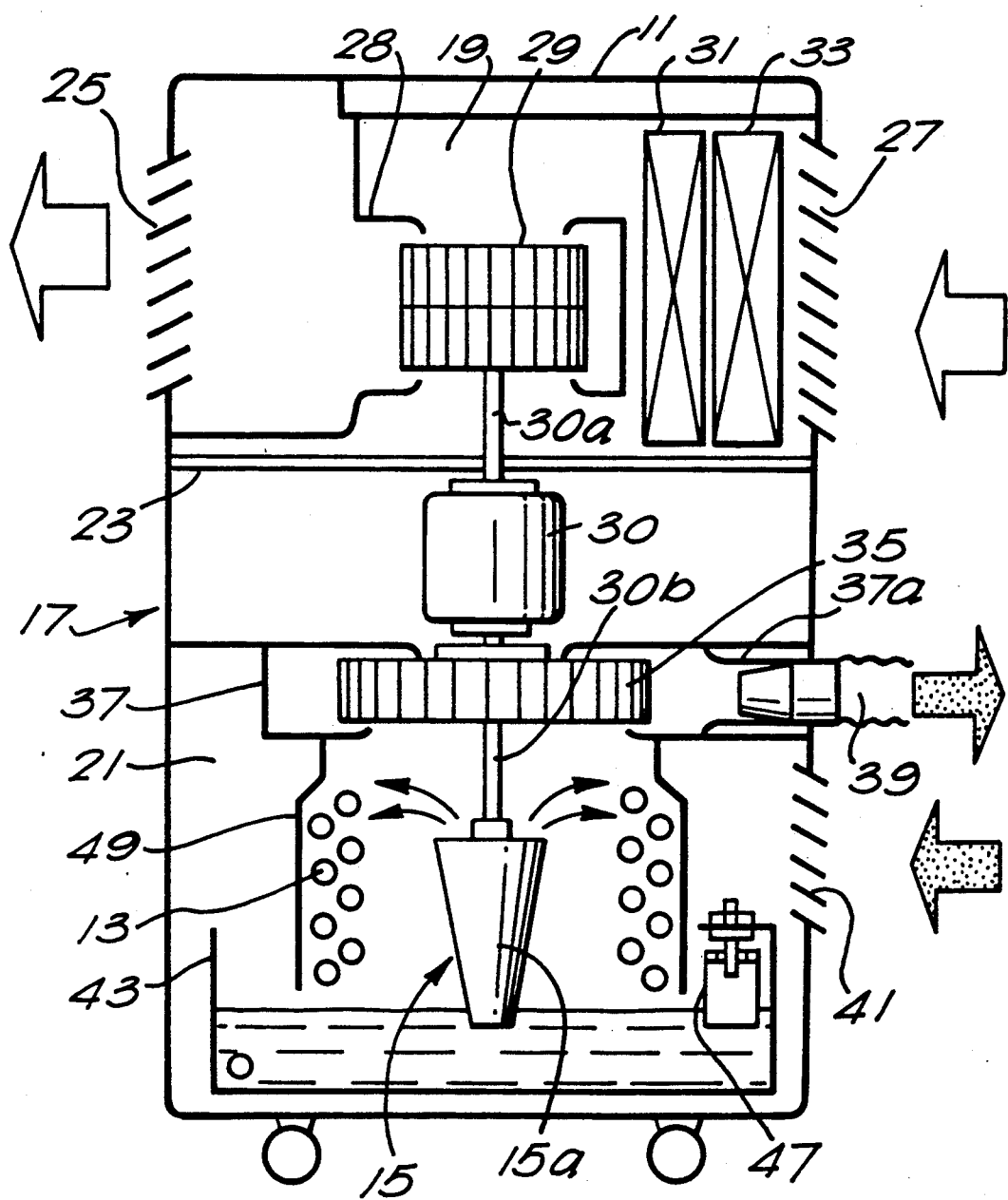
FIG. 1 is a sectional side view illustrating a conventional air conditioning apparatus.

Preferred embodiments of the present invention will now be described with reference to the accompanying drawings. However, in the drawings, the same numerals are applied to the similar elements in the drawings, and therefore, the detailed descriptions thereof are not repeated.

Figure 2:
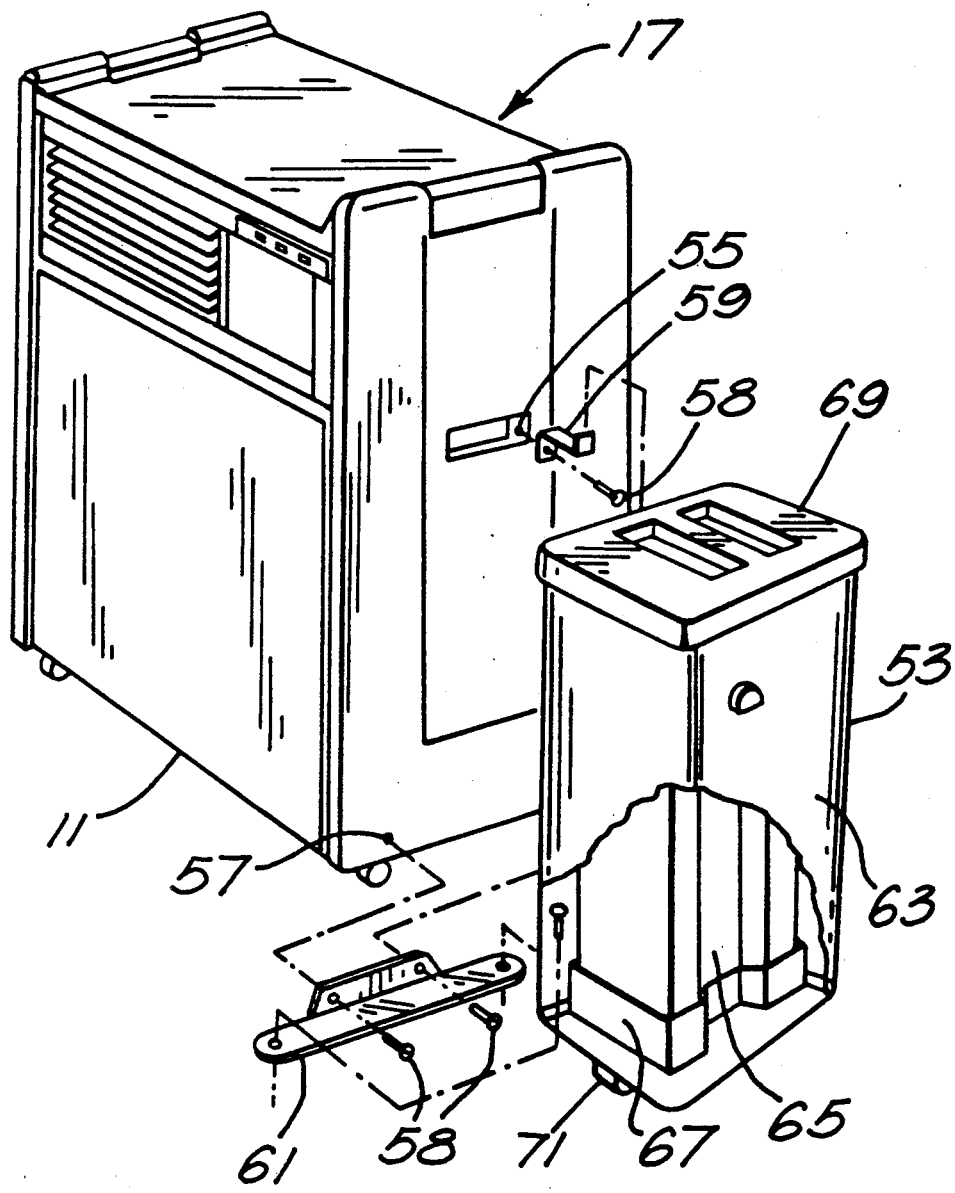
FIG. 2 is a perspective view illustrating an air conditioning apparatus of first embodiment of the present invention when an external water supply tank is separated from the air conditioning apparatus.

As shown in FIG. 2, a separate external water supply tank 53 is arranged outside of casing 17 of air conditioning apparatus 11. In this case, an upper screw hole 55 is formed in one of the side surfaces of casing 17. A pair of lower screw holes 57 is also formed in one of the side surfaces of casing 17. External water supply tank 53 is attached to one of the side surfaces of casing 17 by screws 58 through upper and lower holding plates 59 and 61 respectively. Upper screw hole 55 and lower screw holes 57 may be formed in other side surfaces of casing 17 except the front surface. Therefore, external water supply tank 53 can be selectively attached to a desirable side surface of casing 17 in accordance with the environment where the air conditioning apparatus 11 is installed. External water supply tank 53 includes a housing 63 having an open top, and a water receptacle 65 which has a relatively large water storage capacity. Water receptacle 65 is taken into housing 63 through the open top, and is supported by a tray 67 fixed on the bottom surface of housing 63. The open top of housing 63 is closed by a detachable lid 69. A plurality of casters 71 are attached to the outer bottom surface of housing 63 to move external water supply tank 53 together with air conditioning apparatus 11.

Figure 3:
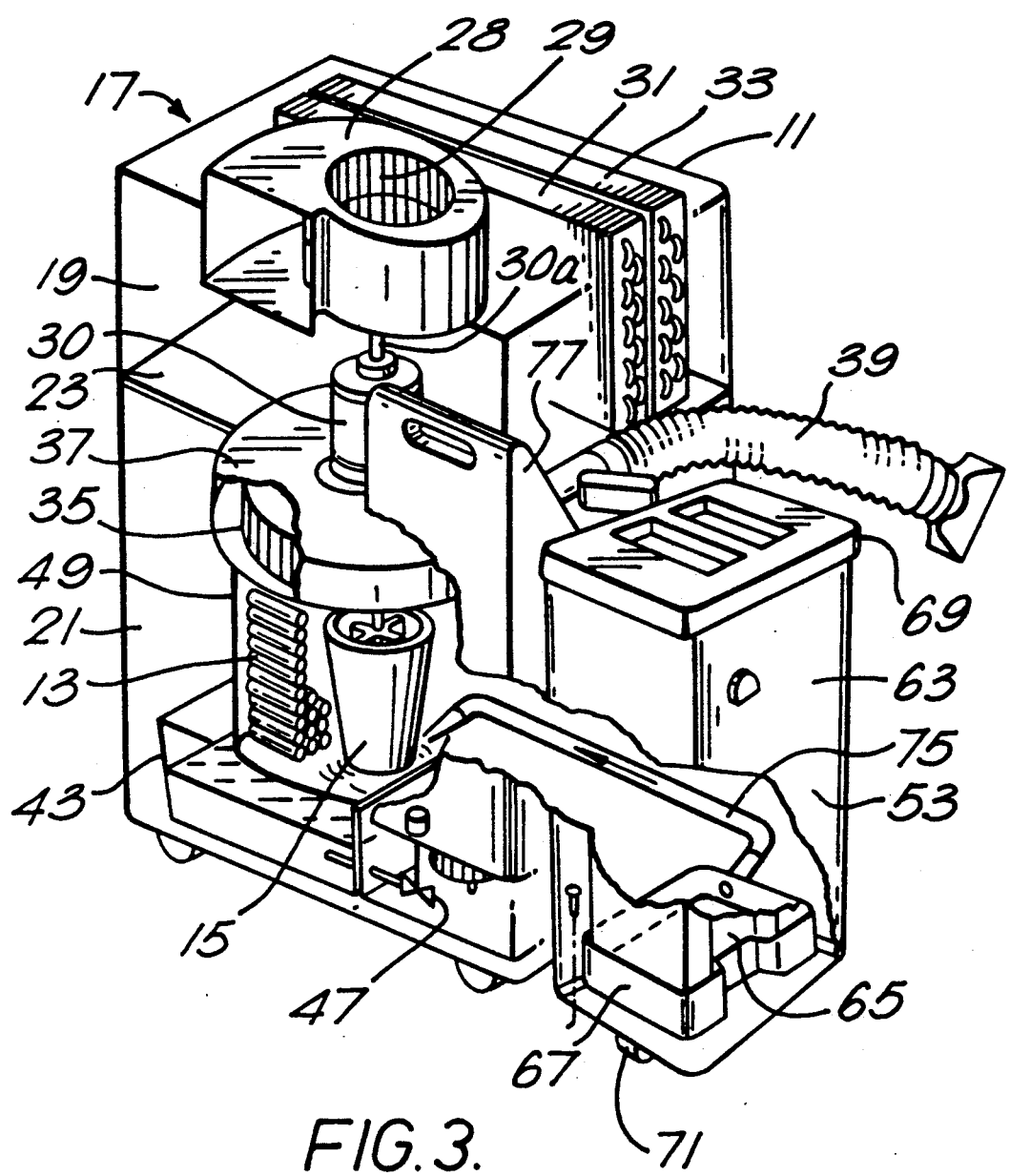
FIG. 3 is a partial cross sectional view in perspective of the air conditioning apparatus of first embodiment shown in FIG. 2.

As shown in FIG. 3, one end of a water pipe 75 is connected to the bottom portion of water receptacle 65 through housing 63 and tray 67. The other end of water pipe 75 is connected to water tank 43 located at lower chamber 21 of casing 17 of air conditioning apparatus 11. An internal water supply tank 77 is disposed in casing 17 to supply water to water tank 43. When external water supply tank 53 is used, the use of internal water supply tank 77 is not required. Therefore, it is not necessary to install internal water supply tank 77 in air conditioning apparatus 11. In the above-described air conditioning apparatus 11, water in water tank 43 is sprayed on condenser 13 by spray device 15, and thus, condenser 13 is cooled by the heat-exchange between water and condenser 13. If an amount of water sprayed on condenser 13 evaporates and the level of water in water tank 43 decreases below a prescribed value, water stored in water receptacle 65 is automatically supplied to water tank 43 through water pipe 75.

With the above-described embodiment, since water supply tank 53 is externally attached to air conditioning apparatus 11, the water string capacity of water supply tank 53 may be increased irrespective of the external size of air conditioning apparatus 11. The number of water replenishments to external water supply tank 53 can be decreased compared with the conventional air conditioning apparatus in which the water supply tank is installed. If the water supply tank is filled with water before a user retires in the evening, air conditioning apparatus 11 may continuously operate until the next morning without the need for refilling water into external water supply tank 53.

Figure 4:
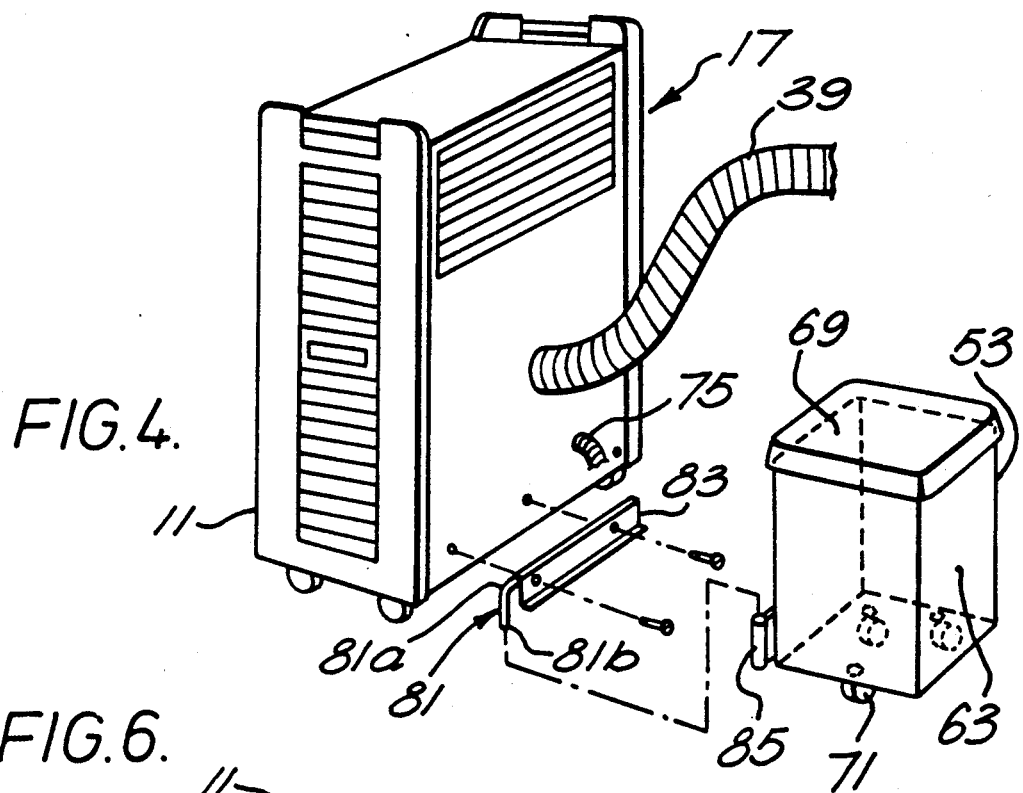
FIG. 4 is a perspective view illustrating an air conditioning apparatus of second embodiment of the present invention when an external water supply tank is separated from the air conditioning apparatus.
Figure 6:
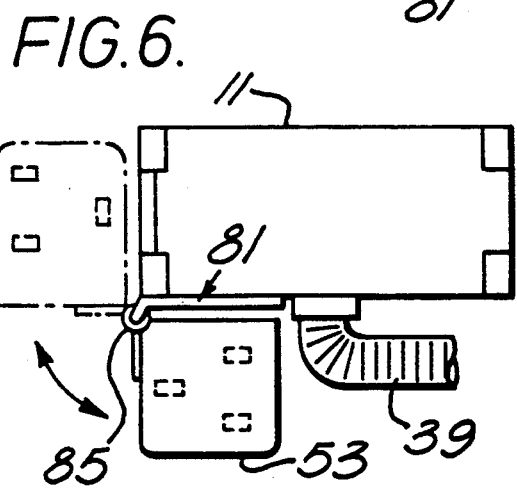
FIG. 6 is a plan view illustrating the air conditioning apparatus of a second embodiment when the external water supply tank is moved between two different locations.
Figure 5:
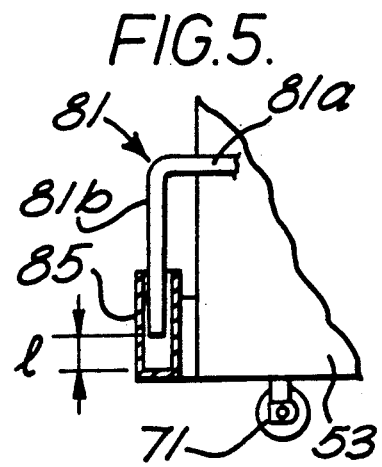
FIG. 5 is an enlarged side view, partly in section, illustrating a supporting arrangement between the external water supply tank and an L-shaped rod attached to the air conditioning apparatus.
Figure 7:
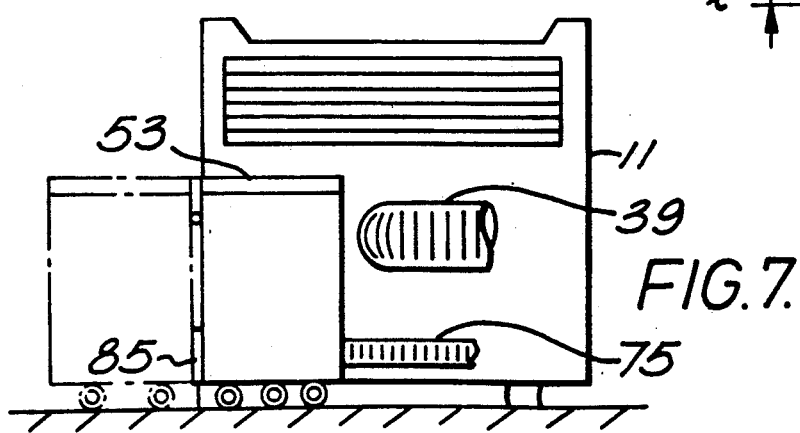
FIG. 7 is a rear view illustrating the air conditioning apparatus of the second embodiment shown in FIG. 6.

A second embodiment of the present invention will not be described hereafter. As shown in FIG. 4, one shaft portion 81a of an L-shaped rod 81 is fixed to the lower portion of the rear surface of casing 17 by a supporting plate 83. The other shaft portion 81b of L-shaped rod 81 projects from the side surface of casing 17, and extends downwardly. A receiving pipe 85 is formed on the lower portion of one of the corners of housing 63 of external water supply tank 53. The other shaft portion 81b of L-shaped rod 81 is inserted into receiving pipe 85, as shown in FIG. 5, to enable external water supply tank 53 to be rotated around the other shaft portion 81b of L-shaped rod 81. As shown in FIGS. 6 and 7, external water supply tank 55 may be located parallel to one of the side and rear surfaces of casing 17. In this case, a clearance l between the bottom surface of receiving pipe 85 of external water supply tank 53 and the lower end of the other shaft portion 81B of L-shaped rod 81 is set to be greater than zero and equal to or less than ten mm.

With the above-described second embodiment, external water supply tank 53 is attached to air conditioning apparatus 11 and is movable between the rear surface and the side surface adjoining to the rear surface of air conditioning apparatus 11. Therefore, air conditioning apparatus 11 may be installed at a desirable place in accordance with the environment where air conditioning apparatus 11 is set. Furthermore, air conditioning apparatus 11 may be moved with a minimum moving width similar to the conventional air conditioning apparatus in spite of the arrangement of external water supply tank 53 when external water supply tank 53 is located parallel to one of the rear and side surfaces of air conditioning apparatus 11. When external water supply tank 53 is located parallel to the rear surface of air conditioning apparatus 11, a user may not see external water supply tank 53 at the front side of air conditioning apparatus, and thus, the external view of air conditioning apparatus 11 may be improved. It is not necessary to provide a supporting plate to the respective rear and side surfaces of air conditioning apparatus 11 to arrange external water supply tank 53 at one of the rear and side surfaces of air conditioning apparatus 11, resulting in a reduction in cost. In the above-described second embodiment, since clearance l between the bottom surface of receiving pipe 85 of external water supply tank 53 and the lower end of the other shaft portion 81b of L-shaped rod 81 is greater than zero and equal to or less than ten mm, external water supply tank 53 is easily moved from one position to the other position even if the floor on which air conditioning apparatus 11 moves is not flat.

The present invention has been described with respect to specific embodiments. However, other embodiments based on the principles of the present invention should be obvious to those of ordinary skill in the art. Such embodiments are intended to be covered by the claims.

What is claimed is:

1. A portable air conditioning apparatus comprising:
a movable outer casing having an outer wall for defining an interior space;
air conditioning means disposed in the outer casing for conditioning air flowing into the interior space, the air conditioning means including a condenser cooled by water, a part of the water being subject to evaporation; and
water supply means movably attached to the outer wall of the outer casing outside of the interior space for storing water supplied to the condenser.

2. An apparatus according to claim 1, wherein the air conditioning means includes spray means for spraying water onto the condenser.

3. An apparatus according to claim 1, wherein the outer casing includes first caster means for movably supporting the outer casing.

4. A portable air conditioning apparatus comprising:
a movable outer casing having an outer wall for defining an interior space and including first caster means for movably supporting the outer casing;
air conditioning means disposed in the outer casing for conditioning air flowing into the interior space, the air conditioning means including a condenser cooled by water, a part of the water being subject to evaporation; and
external water supply means movably attached to the outer wall of the outer casing for storing water supplied to the condenser and including second caster means for movably supporting the external water supply means.

5. A portable air conditioning apparatus comprising:
a movable outer casing;
air conditioning means disposed in the outer casing for conditioning air flowing into a defined space, the air conditioning means including a condenser cooled by water;
spray means associated with the air conditioning means for supplying water onto the condenser; and
movable external water supply means for storing water supplied to the spray means, the external water supply means including second caster means for movably supporting the external water supply means moving simultaneously with the outer casing the outer casing including connecting means for connecting the outer casing and the external water supply means and first caster means for movably supporting the outer casing.

6. An apparatus according to claim 5, wherein the outer casing has adjoining outer side walls, and the connecting means includes pivot means for moving the external water supply means from abutting relation with one of the adjoining outer side walls to abutting relation with the other outer side wall.

7. An apparatus according to claim 6, wherein the pivot means includes a pipe element fixed to the external water supply means, and a rod element fixed to the outer casing, the rod element having a free end for movable insertion into the pipe element.

8. A portable air conditioning apparatus comprising:
a movable outer casing having an outer wall for defining an interior space;
air conditioning means disposed in the outer casing for conditioning air flowing into the interior space, the air conditioning means including a condenser cooled by water, a part of the water being subject to evaporation;
internal water supply means disposed in the outer casing for storing water supplied to the condenser; and
water supply means removably attached to the outer wall of the outer casing outside of the interior space for storing water supplied to the condenser.

* * * * *